(12) United States Patent
Allard (10) Patent No.: US 12,396,390 B2
(45) Date of Patent: Aug. 26, 2025

(54) SELF-PROPELLED ROBOTIC WORK TOOL

(71) Applicant: HUSQVARNA AB, Huskvarna (SE)

(72) Inventor: Martin Allard, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/114,614

(22) Filed: Feb. 27, 2023

(65) Prior Publication Data
US 2023/0270047 A1 Aug. 31, 2023

(30) Foreign Application Priority Data

Feb. 28, 2022 (SE) .................................. 2250268-6

(51) Int. Cl.
*A01D 34/81* (2006.01)
*A01D 34/00* (2006.01)
(Continued)

(52) U.S. Cl.
CPC ........... *A01D 34/81* (2013.01); *A01D 34/008* (2013.01); *A01D 67/00* (2013.01); *A01D 2101/00* (2013.01)

(58) Field of Classification Search
CPC ...... A01D 34/008; A01D 34/81; A01D 67/00; A01D 2101/00; A01D 75/18; A01D 34/00; A01D 34/905; B60L 1/003; B60L 3/0061; B60L 15/20; B60L 50/51; B60L 50/52; B60L 50/66; B60L 2200/40; B60L 2220/16; B60L 2220/46; B60L 2240/36; B60L 2240/421; B60L 2260/28; Y02T 10/64; Y02T 10/70; Y02T 10/72; B25J 5/007;
(Continued)

(56) References Cited

U.S. PATENT DOCUMENTS 3,729,912 A * 5/1973 Weber .................... A01D 34/62
56/320.1
5,044,852 A * 9/1991 Sweeney ............... F16B 13/143
248/205.3
(Continued)

FOREIGN PATENT DOCUMENTS

CN   106717559 A   5/2017
CN   213404158 U   6/2021
(Continued)

OTHER PUBLICATIONS

Search Report and Office Action for Swedish Application No. 2250268-6 mailed Sep. 16, 2022.

*Primary Examiner* — Timothy Wilhelm
(74) *Attorney, Agent, or Firm* — Burr & Forman LLP (57) ABSTRACT

A self-propelled robotic work tool (1) is disclosed comprising a tool chassis (3) and a number of tool support members (61, 62, 63) attached to the tool chassis (3) and being configured to abut against a ground surface (27) in a first plane (P1) during operation of the work tool (1). The work tool (1) further comprises a number of snap fit assemblies (s1-s4) and a tool body (5) attachable to the tool chassis (3) via the number of snap fit assemblies (s1-s4). The number of snap fit assemblies (s1-s4) is configured to allow movement of at least a portion (5') the tool body (5) relative to the tool chassis (3) between a lowered and a raised position in directions (d1, d2) substantially perpendicular to the first plane (P1) when the tool body (5) is attached to the tool chassis (3) via the number of snap fit assemblies (s1-s4).

18 Claims, 6 Drawing Sheets

(51) Int. Cl.
*A01D 67/00* (2006.01)
*A01D 101/00* (2006.01)

(58) Field of Classification Search
CPC .......... B25J 11/00; B25J 9/0003; G05D 1/00; G05D 2201/0208; F16B 2/22; F16B 21/125; A01B 69/008; A47L 2201/00; B60R 21/2037
See application file for complete search history.

(56) References Cited

U.S. PATENT DOCUMENTS

| | | | | |
|---|---|---|---|---|
| 5,259,175 | A * | 11/1993 | Schmidt | A01D 34/74 56/17.2 |
| 5,347,799 | A | 9/1994 | Hosaka et al. | |
| 7,441,298 | B2 * | 10/2008 | Svendsen | A47L 9/12 15/49.1 |
| 7,448,113 | B2 * | 11/2008 | Jones | A47L 9/0411 15/360 |
| 7,761,954 | B2 * | 7/2010 | Ziegler | G05D 1/0272 15/340.1 |
| 8,234,848 | B2 * | 8/2012 | Messina | A01D 34/008 56/17.1 |
| 8,239,992 | B2 * | 8/2012 | Schnittman | A47L 11/302 15/52.1 |
| 8,336,282 | B2 * | 12/2012 | Messina | B60L 3/0061 56/320.1 |
| 8,584,307 | B2 * | 11/2013 | Won | G05D 1/0227 15/340.1 |
| 8,741,013 | B2 * | 6/2014 | Swett | A47L 9/22 55/482 |
| 9,113,595 | B2 * | 8/2015 | Roth | A01D 34/664 |
| 9,320,398 | B2 * | 4/2016 | Hussey | A47L 11/4041 |
| 9,470,025 | B2 * | 10/2016 | Canonge | F16B 21/073 |
| 9,699,964 | B2 * | 7/2017 | Roth | A01D 34/81 |
| 9,883,778 | B2 * | 2/2018 | Vanderstegen-Drake | A47L 9/009 |
| 9,943,203 | B2 * | 4/2018 | Samuels | B60L 53/14 |
| 10,150,441 | B2 | 12/2018 | Sella et al. | |
| 10,407,931 | B2 * | 9/2019 | Zerweck | E04H 4/1654 |
| 10,440,879 | B2 * | 10/2019 | Björn | B60L 50/66 |
| 10,806,314 | B2 * | 10/2020 | Suchman | A47L 7/0038 |
| 11,072,250 | B2 * | 7/2021 | Gilbert, Jr. | A47L 11/4041 |
| 11,096,325 | B2 * | 8/2021 | Song | A01D 34/81 |
| 11,129,327 | B2 * | 9/2021 | Hong | B62D 63/04 |
| 11,154,005 | B2 * | 10/2021 | Hong | A01D 34/008 |
| 11,178,816 | B2 * | 11/2021 | Anderson | A01D 34/81 |
| 11,439,283 | B2 * | 9/2022 | Krebs | A47L 11/302 |
| 11,540,440 | B2 * | 1/2023 | Olsson | A01D 67/005 |
| 11,583,158 | B2 * | 2/2023 | Fiebig | A47L 9/30 |
| 11,696,526 | B2 * | 7/2023 | Curtis | A01D 34/74 56/10.2 A |
| 11,781,655 | B2 * | 10/2023 | Johansson | F16J 15/027 277/358 |
| 11,786,094 | B2 * | 10/2023 | DeJonge | A47L 9/0477 15/347 |
| 2005/0021181 | A1 * | 1/2005 | Kim | A47L 9/009 318/568.12 |
| 2016/0128275 | A1 * | 5/2016 | Johnson | G05D 1/0227 700/258 |
| 2017/0168345 | A1 | 6/2017 | Wu et al. | |
| 2019/0298120 | A1 * | 10/2019 | Zhu | A47L 9/1409 |
| 2019/0307062 | A1 * | 10/2019 | Hong | G05D 1/0242 |
| 2020/0141464 | A1 * | 5/2020 | Wang | F16B 21/065 |
| 2020/0256362 | A1 | 8/2020 | Sakamoto | |
| 2020/0315087 | A1 * | 10/2020 | Svensson | A01D 75/20 |
| 2020/0383547 | A1 * | 12/2020 | Sutter | A47L 11/4041 |
| 2021/0329841 | A1 * | 10/2021 | Cuong | A01D 69/02 |
| 2021/0352842 | A1 * | 11/2021 | Pu | A01D 34/733 |
| 2022/0080593 | A1 * | 3/2022 | Huang | A47L 11/4061 |
| 2022/0110245 | A1 * | 4/2022 | Johansson | F16H 25/24 |
| 2022/0151143 | A1 * | 5/2022 | Liljedahl | A01D 34/008 |
| 2022/0151451 | A1 * | 5/2022 | He | A47L 11/4083 |
| 2022/0272902 | A1 * | 9/2022 | Ma | B60L 53/30 |
| 2022/0274655 | A1 * | 9/2022 | Ma | A47L 9/009 |
| 2022/0322603 | A1 * | 10/2022 | Inaba | A01D 34/008 |
| 2023/0354739 | A1 * | 11/2023 | Schiffer | B60K 1/02 |

FOREIGN PATENT DOCUMENTS

| | | |
|---|---|---|
| DE | 202021101493 U1 | 4/2021 |
| EP | 3560312 A2 | 10/2019 |
| EP | 3563747 A1 | 11/2019 |
| WO | 2013125995 A1 | 8/2013 |
| WO | 2015154822 A1 | 10/2015 |
| WO | 2019154894 A1 | 8/2019 |
| WO | 2019169778 A1 | 9/2019 |
| WO | 2021060254 A1 | 4/2021 |

* cited by examiner

SELF-PROPELLED ROBOTIC WORK TOOL

TECHNICAL FIELD

The present disclosure relates to self-propelled robotic work tool. In more detail, the present disclosure relates to a self-propelled robotic work tool comprising a tool chassis and a tool body attachable to the tool chassis.

BACKGROUND

Self-propelled robotic work tools, such as self-propelled autonomous robotic lawnmowers, have become increasingly popular, partly because they are usually capable of performing work which previously was made manually. A self-propelled robotic work tool is capable of navigating in an area in an autonomous manner, i.e., without the intervention or the direct control of a user. The robotic work tool may move in a systematic and/or random pattern to ensure that the area is completely covered. Some robotic work tools require a user to set up a border wire around an area that defines the area to be operated by the robotic work tool. Such robotic work tools use a sensor to locate the wire and thereby the boundary of the area to be operated.

Moreover, robotic work tools usually comprise other types of positioning units and sensors, for example sensors for detecting an event, such as a collision event with an object within the area, a lifting event, or the like. Furthermore, some robotic work tools comprise a satellite-based positioning unit. A satellite-based positioning unit typically utilize a space-based satellite navigation system, such as a Global Positioning System (GPS), The Russian GLObal NAvigation Satellite System (GLONASS), European Union Galileo positioning system, Chinese Compass navigation system, or Indian Regional Navigational Satellite System to provide a current position estimate of the robotic work tool. Generally, robotic work tools operate unattended within the area in which they operate. Examples of such areas are lawns, gardens, parks, sports fields, golf courts and the like.

Usually, a robotic work tool comprises a control arrangement configured to navigate the robotic work tool based on input from one or more of the above-mentioned types of positioning units and sensors. Moreover, a robotic work tool usually comprises one or more batteries configured to supply electricity to one or more electric propulsion motors of the robotic work tool and/or one or more electrically driven tools, such as one or more cutting tools.

Many robotic work tools comprise a tool chassis comprising a number of tool support members, such as wheels, and a tool body attached to the tool chassis. The tool body may for example comprise an outer shell of the robotic work tool, a number of mudguards, and the like.

Robotic work tools usually operate in areas which may cause accumulation of matter, such as dust, debris, and/or grass clippings, onto various parts and components of the robotic work tool. Moreover, at certain times, it may be required or desired to perform service, repair, or maintenance of a robotic work tool. Therefore, it is an advantage if various components and parts of the robotic work tool can be reached in a simple manner for example for cleaning, service, repair, maintenance, or replacement purposes. However, in many cases, special tools and skills are required for reaching various parts and components of a robotic work tool. Therefore, at present, this type of work is normally done by professionals.

Moreover, as indicated, a robotic work tool may collide with objects during operation and may be subjected to rough handling by a user. Therefore, when designing a robotic work tool, it is an advantage if the robotic work tool is made to withstand collisions and impact forces from various directions.

Furthermore, generally, on today's consumer market, it is an advantage if products, such as robotic work tools and associated components, systems, and arrangements, have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a self-propelled robotic work tool comprising a tool chassis, a number of tool support members attached to the tool chassis and being configured to abut against a ground surface in a first plane during operation of the work tool, a number of snap fit assemblies, and a tool body attachable to the tool chassis via the number of snap fit assemblies. The number of snap fit assemblies is configured to allow movement of at least a portion the tool body relative to the tool chassis between a lowered and a raised position in directions substantially perpendicular to the first plane when the tool body is attached to the tool chassis via the number of snap fit assemblies.

Since the tool body is attachable to the tool chassis via the number of snap fit assemblies, a robotic work tool is provided having conditions for a quick and simple attachment and removal of the tool body to/from the tool chassis without the need for special tools or skills. Thus, due to these features, cleaning, service, repair, maintenance, or replacement of components and parts of the robotic work tool can be performed in a quicker and simpler manner.

Moreover, since the number of snap fit assemblies is configured to allow movement of the at least portion the tool body relative to the tool chassis between the lowered and raised positions, a relative movement between the at least portion of the tool body and the tool chassis is allowed for in a simple and efficient manner while conditions are provided for a quick and simple attachment and removal of the tool body to/from the tool chassis.

The relative movement between the at least portion the tool body relative to the tool chassis between the lowered and raised positions can be utilized by a sensor for detecting various events, such as a lifting event of the robotic work tool. Thus, a robotic work tool is provided simplifying such detection while allowing a quick and simple attachment and removal of the tool body to/from the tool chassis without the need for special tools or skills.

Furthermore, since the tool body is attachable to the tool chassis via the number of snap fit assemblies, a robotic work tool is provided having conditions and characteristics suitable for being manufactured and assembled in a cost-efficient manner. This is because a low-cost arrangement, i.e., the number of snap fit assemblies, is utilized for attaching the tool body to the tool chassis and since the tool body can be attached to the tool chassis in a quick and simple manner during assembly of the robotic work tool, for example in a manufacturing facility.

Accordingly, a robotic work tool is provided overcoming, or at least alleviating, at least some of the above-mentioned problems and drawbacks. As a result, the above-mentioned object is achieved.

Optionally, the number of snap fit assemblies comprises a first snap fit assembly comprising a first snap fit element arranged on the tool chassis and a second snap fit element arranged on the tool body, and wherein one of the first and second snap fit elements comprises a snap fit aperture and the other of the first and second snap fit elements comprises a snap fit protrusion configured to protrude into the snap fit aperture when the tool body is attached to the tool chassis. Thereby, a rigid and reliable attachment of the tool body to the tool chassis can be ensured. Moreover, a robotic work tool is provided allowing a user to remove the tool body from the tool chassis in a simple and convenient manner.

Optionally, the width of the snap fit aperture is greater than the width of the snap fit protrusion measured in a direction perpendicular to the first plane. Thereby, the movement of the at least portion the tool body relative to the tool chassis between the lowered and raised positions is allowed for in a simple and cost-efficient manner. This is because the greater width of the snap fit aperture than the width of the snap fit protrusion can provide a play allowing the snap fit protrusion to move inside the snap fit aperture upon movement of the at least portion the tool body relative to the tool chassis between the lowered and raised positions. Furthermore, due to these features, the need for arranging one or both of the first and second snap fit elements such that they can move relative to the robotic work tool, or relative to the tool chassis, is circumvented.

Optionally, the snap fit protrusion is configured to abut against an inner delimiting surface of the snap fit aperture to prevent movement of the tool body past the raised position when the tool body is attached to the tool chassis via the number of snap fit assemblies. Thereby, the movement of the at least portion the tool body relative to the tool chassis between the lowered and raised positions is allowed for in a simple and cost-efficient manner, while ensuring attachment of the tool body to the tool chassis of the robotic work tool.

Optionally, one of the first and second snap fits elements is formed as a cantilever. Thereby, a user-friendly robotic work tool is provided having conditions for a quick and simple attachment and removal of the tool body to/from the tool chassis without the need for special tools or skills. Moreover, a robotic work tool is provided having conditions and characteristics suitable for being manufactured and assembled in a cost-efficient manner.

Optionally, the first snap fit assembly is arranged at a front section of the work tool as seen relative to a forward moving direction of the work tool. Thereby, a robotic work tool is provided having conditions for a quick and simple attachment and removal of the tool body to/from the tool chassis and having conditions for allowing movement of a front section of the tool body relative to the tool chassis between the lowered and raised positions in a simple and cost-efficient manner.

Optionally, the number of snap fit assemblies comprises a second snap fit assembly, and wherein the first and second snap fit assemblies are arranged at a respective side of a vertical longitudinal centre plane of the work tool. Thereby, a rigid and reliable attachment of the tool body to the tool chassis can be further ensured.

Optionally, the number of snap fit assemblies comprises a third snap fit assembly, and wherein the first and third snap fit assemblies are arranged at a respective side of a vertical lateral centre plane of the work tool. Thereby, a rigid and reliable attachment of the tool body to the tool chassis can be further ensured.

Optionally, the work tool comprises a top cover attachable to the tool body through releasable attachment means. Thereby, the aesthetic appearance of the robotic work tool can be improved in a simple and cost-efficient manner. Moreover, the top cover can prevent dust and debris from entering the tool body from the top of the robotic work tool.

Optionally, the top cover prevents access to at least one snap fit assembly of the number of snap fit assemblies when the top cover is attached to the tool body. Thereby, an unintended opening of the at least one snap fit assembly is prevented in a simple and efficient manner when the top cover is attached to the tool body. As a result, an unintended detachment of the tool body from the tool chassis is prevented in an efficient manner when the top cover is attached to the tool body.

Optionally, the tool body comprises a number of apertures each arranged at a snap fit assembly of the number of snap fit assemblies and having a size allowing a portion of at least one finger of a user to be inserted into the aperture to reach the snap fit assembly, and wherein the top cover is configured to cover the number of apertures when attached to the tool body. Due to the number of apertures, a robotic work tool is provided allowing a user to unlock a snap fit assembly in a simple manner by inserting at least one finger into an aperture of the number of apertures. Moreover, since the top cover is configured to cover the number of apertures when attached to the tool body, an unintended opening of a snap fit assembly can be prevented in a simple and efficient manner when the top cover is attached to the tool body. As a result, an unintended detachment of the tool body from the tool chassis is prevented in an efficient manner when the top cover is attached to the tool body. Furthermore, due to these features, conditions are provided for a substantially flat top cover which provides conditions for a more aesthetic appearance of the robotic work tool.

Optionally, the work tool comprises a number of securing members attachable to the tool body, and wherein each securing member is configured to prevent one snap fit assembly of the number of snap fit assemblies from opening when attached to the tool body. Thereby, an unintended opening of the snap fit assemblies, and thus also an unintended detachment of the tool body from the tool chassis, can be further prevented in a quick and efficient manner, simply by attaching the number of securing members to the tool body.

Optionally, the top cover comprises a number of securing members each configured to prevent one snap fit assembly of the number of snap fit assemblies from opening when the top cover is attached to the tool body. Thereby, an unintended opening of the snap fit assemblies, and thus also an unintended detachment of the tool body from the tool chassis, can be further prevented in an even simpler and quicker manner, simply by attaching the top cover to the tool body.

Optionally, the work tool comprises a fixation assembly comprising a first fixation structure arranged on the tool chassis and a second fixation structure arranged on the tool body, and wherein the first and second fixation structures are configured to abut against each other when the tool body is attached to the tool chassis to prevent movement of the tool body relative to the tool chassis in directions substantially parallel to the first plane while allowing movement of the tool body relative to the tool chassis in directions substantially perpendicular to the first plane. Thereby, due to the fixation assembly, low or no forces are obtained on the number of snap fit assemblies upon impacts between the robotic work tool and external objects in directions substantially parallel to the first plane. As a result, a more rigid and durable robotic work tool is provided and wear and tear of the number of snap fit assemblies can be lowered. Furthermore, due to these features, an unintended opening of a snap fit assembly, and thus also an unintended detachment of the tool body from the tool chassis, can be further prevented.

Optionally, the fixation assembly comprises a first and a second pair of fixation elements each comprising a fixation element arranged on the tool chassis and a fixation element arranged on the tool body, and wherein the first and second pair of fixation elements are arranged at a respective side of a vertical longitudinal centre plane of the work tool. Thereby, an even more rigid and durable robotic work tool can be provided for example since turning of the tool body relative to the tool chassis can be prevented in an efficient manner by the first and second pair of fixation elements.

Optionally, the fixation assembly comprises a third pair of fixation elements comprising a fixation element arranged on the tool chassis and a fixation element arranged on the tool body, and wherein the third pair of fixation elements are arranged at a different side of a vertical lateral centre plane of the work tool than the first and second pair of fixation elements. Thereby, an even more rigid and durable robotic work tool can be provided for example since turning of the tool body relative to the tool chassis can be prevented in an efficient manner by the first, second, and third pair of fixation elements.

Optionally, the work tool comprises a sensor configured to detect movement of the tool body from the lowered position to the raised position. Thereby, a robotic work tool is provided capable of detecting events, such as a lifting event of the robotic work tool, in a simple and efficient manner while allowing a quick and simple attachment and removal of the tool body to/from the tool chassis without the need for special tools or skills.

Optionally, the work tool is a self-propelled robotic lawnmower. Since the tool body is attachable to the tool chassis via the number of snap fit assemblies, a robotic lawnmower is provided having conditions for a quick and simple attachment and removal of the tool body to/from the tool chassis without the need for special tools or skills. Thus, due to these features, cleaning, service, repair, maintenance, or replacement of components and parts of the robotic lawnmower can be performed in a quick and simple manner.

Moreover, a relative movement between the at least portion of the tool body and the tool chassis of the robotic lawnmower is allowed for in a simple and efficient manner while providing conditions for a quick and simple attachment and removal of the tool body to/from the tool chassis.

Furthermore, since the tool body is attachable to the tool chassis via the number of snap fit assemblies, a robotic lawnmower is provided having conditions and characteristics suitable for being manufactured and assembled in a cost-efficient manner. This is because a low-cost arrangement, i.e., the number of snap fit assemblies, is utilized for attaching the tool body to the tool chassis and since the tool body can be attached to the tool chassis in a quick and simple manner during assembly of the robotic lawnmower, for example in a manufacturing facility.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
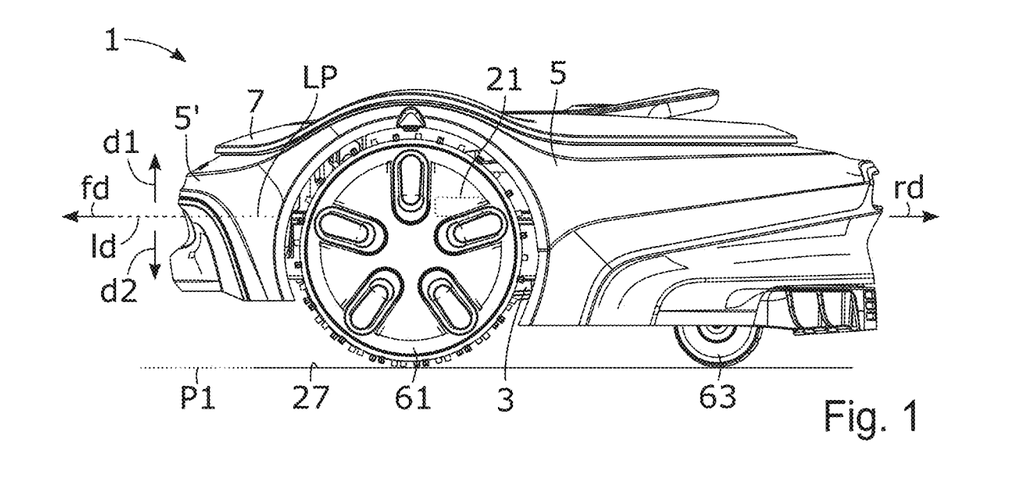
FIG. 1 illustrates a self-propelled robotic work tool according to some embodiments.

FIG. 1 illustrates a self-propelled robotic work tool 1 according to some embodiments of the present disclosure. For reasons of brevity and clarity, the self-propelled robotic work tool 1 is in some places herein referred to as "the work tool 1." According to the illustrated embodiments, the work tool 1 is a self-propelled robotic lawnmower, i.e., a robotic lawnmower capable of navigating and cutting grass in an autonomous manner in an area without the intervention or the control of a user. Moreover, according to the illustrated embodiments, the robotic work tool 1 is a small or mid-sized robotic lawnmower configured to be used to cut grass in areas used for aesthetic and recreational purposes, such as gardens, parks, city parks, sports fields, lawns around houses, apartments, commercial buildings, offices, and the like.

According to further embodiments, the robotic work tool 1, as referred to herein, may be another type of robotic work tool capable of navigating and operating an area in an autonomous manner without the intervention or the control of a user, such as for example a street sweeper, a snow removal tool, a mine clearance robot, or any other robotic work tool that is required to operate in a work area in a methodical and systematic or position oriented manner.

The robotic work tool 1 comprises a tool chassis 3 and a number of tool support members 61, 63 attached to the tool chassis 3. Each tool support member 61, 63 is configured to abut against a ground surface 27 in a first plane P1 during operation of the robotic work tool 1 to support the tool chassis 3 relative to the ground surface 27. Accordingly, the first plane P1 will extend along a ground surface 27 when the robotic work tool 1 is positioned on a flat ground surface 27.

According to the illustrated embodiments, the tool support members 61, 63 is wheels 61, 63 of the robotic work tool 1. According to the illustrated embodiments, the robotic work tool 1 comprises four wheels 61, 63, namely two drive wheels 61 and two support wheels 63. The drive wheels 61 of the robotic work tool 1 may each be powered by an electrical motor of the robotic work tool 1 to provide motive power and/or steering of the robotic work tool 1. Such electric motors may be arranged on the tool chassis 3 of the robotic work tool 1, as is further explained herein.

The robotic work tool 1 further comprises a tool body 5. In FIG. 1, the tool body 5 is attached to the tool chassis 3 of the robotic work tool 1. Moreover, in FIG. 1, a longitudinal direction 1d of the robotic work tool 1 is indicated. The longitudinal direction 1d of the robotic work tool 1 extends in a longitudinal plane LP of the robotic work tool 1. The longitudinal plane LP is parallel to the first plane P1. The longitudinal direction 1d of the robotic work tool 1 is thus parallel to the first plane P1 and thus also to a ground surface 27 when the robotic work tool 1 is positioned onto a flat ground surface 27. Moreover, the longitudinal direction 1d of the robotic work tool 1 is parallel to a forward moving direction fd of travel of the robotic work tool 1 as well as a reverse moving direction rd of travel of the robotic work tool 1.

According to the illustrated embodiments, the drive wheels 61 of the robotic work tool 1 are non-steered wheels having a fix rolling direction in relation to the tool chassis 3. The respective rolling direction of the drive wheels 61 of the robotic work tool 1 is substantially parallel to the longitudinal direction 1d of the robotic work tool 1. According to the illustrated embodiments, the support wheels 63 are non-driven wheels. Moreover, according to the illustrated embodiments, the support wheels 63 can pivot around a respective pivot axis such that the rolling direction of the respective support wheel 63 can follow a travel direction of the robotic work tool 1.

As understood from the above, when the drive wheels 61 of the robotic work tool 1 are rotated at the same rotational velocity in a forward rotational direction, and no wheel slip is occurring, the robotic work tool 1 will move in the forward moving direction fd indicated in FIG. 1. Likewise, when the drive wheels 61 of the robotic work tool 1 are rotated at the same rotational velocity in a reverse rotational direction, and no wheel slip is occurring, the robotic work tool 1 will move in the reverse moving direction rd indicated in FIG. 1. The reverse moving direction rd is opposite to the forward moving direction fd.

According to the illustrated embodiments, the robotic work tool 1 may be referred to as a four-wheeled front wheel driven robotic work tool 1. According to further embodiments, the robotic work tool 1 may be provided with another number of wheels 61, 63, such as three wheels. Moreover, according to further embodiments, the robotic work tool 1 may be provided with another configuration of driven and non-driven wheels, such as a rear wheel drive or an all-wheel drive.

According to the illustrated embodiments, the robotic work tool 1 comprises a control arrangement 21. The control arrangement 21 may be configured to control propulsion of the robotic work tool 1, and steer the robotic work tool 1, by controlling electrical motors of the robotic work tool 1 arranged to drive the drive wheels 61 of the robotic work tool 1. According to further embodiments, the control arrangement 21 may be configured to steer the robotic work tool 1 by controlling the angle of steered wheels of the robotic work tool 1. According to still further embodiments, the robotic work tool may be an articulated robotic work tool, wherein the control arrangement 21 may be configured to steer the robotic work tool by controlling the angle between frame portions of the articulated robotic work tool.

The control arrangement 21 may be configured to control propulsion of the robotic work tool 1, and steer the robotic work tool 1, so as to navigate the robotic work tool 1 in an area to be operated. The robotic work tool 1 may further comprise one or more sensors arranged to sense a magnetic field of a wire, and/or one or more positioning units, and/or one or more sensors arranged to detect an impending or ongoing collision event with an object. In addition, the robotic work tool 1 may comprise a communication unit connected to the control arrangement 21. The communication unit may be configured to communicate with a remote communication unit to receive instructions therefrom and/or to send information thereto. The communication may be performed wirelessly over a wireless connection such as the internet, or a wireless local area network (WLAN), or a wireless connection for exchanging data over short distances using short-wavelength, i.e. ultra-high frequency (UHF) radio waves in the industrial, scientific, and medical (ISM) band from 2.4 to 2.486 GHz.

The control arrangement 21 may be configured to control propulsion of the robotic work tool 1, and steer the robotic work tool 1, so as to navigate the robotic work tool 1 in a systematic and/or random pattern to ensure that an area is completely covered, using input from one or more of the above-described sensors and/or units. Furthermore, the robotic work tool 1 may comprise one or more batteries arranged to supply electricity to components of the robotic work tool 1. As an example, the one or more batteries may be arranged to supply electricity to electrical motors of the robotic work tool 1 by an amount controlled by the control arrangement 21.

Figure 2:
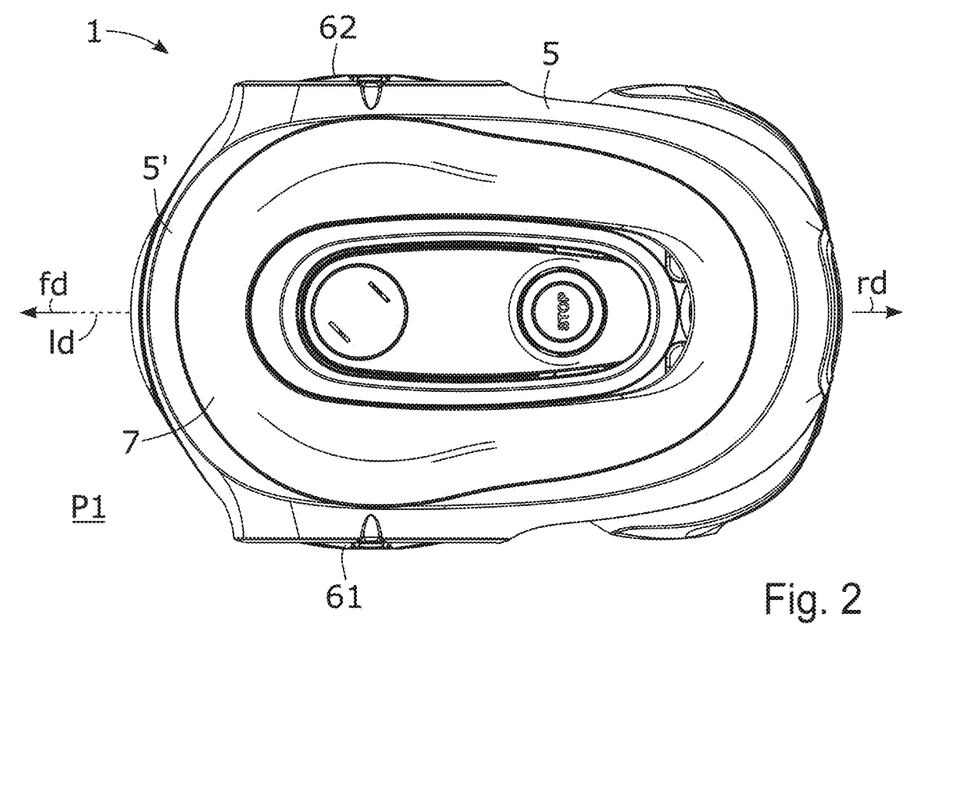
FIG. 2 illustrates a first top view of the robotic work tool illustrated in FIG. 1.

FIG. 2 illustrates a first top view of the robotic work tool 1 illustrated in FIG. 1. In FIG. 2, the robotic work tool 1 is illustrated as viewed in a direction straight towards the first plane P1. In FIG. 2, each of the drive wheels 61, 62 of the robotic work tool 1 can be seen. Moreover, in FIG. 2, a top cover 7 of the robotic work tool 1 can be clearly seen. The top cover 7 is also indicated in FIG. 1. The top cover 7 is attached to the tool body 5 of the robotic work tool 1. The features, functions, and advantages of the top cover 7 is further explained below.

Figure 3:
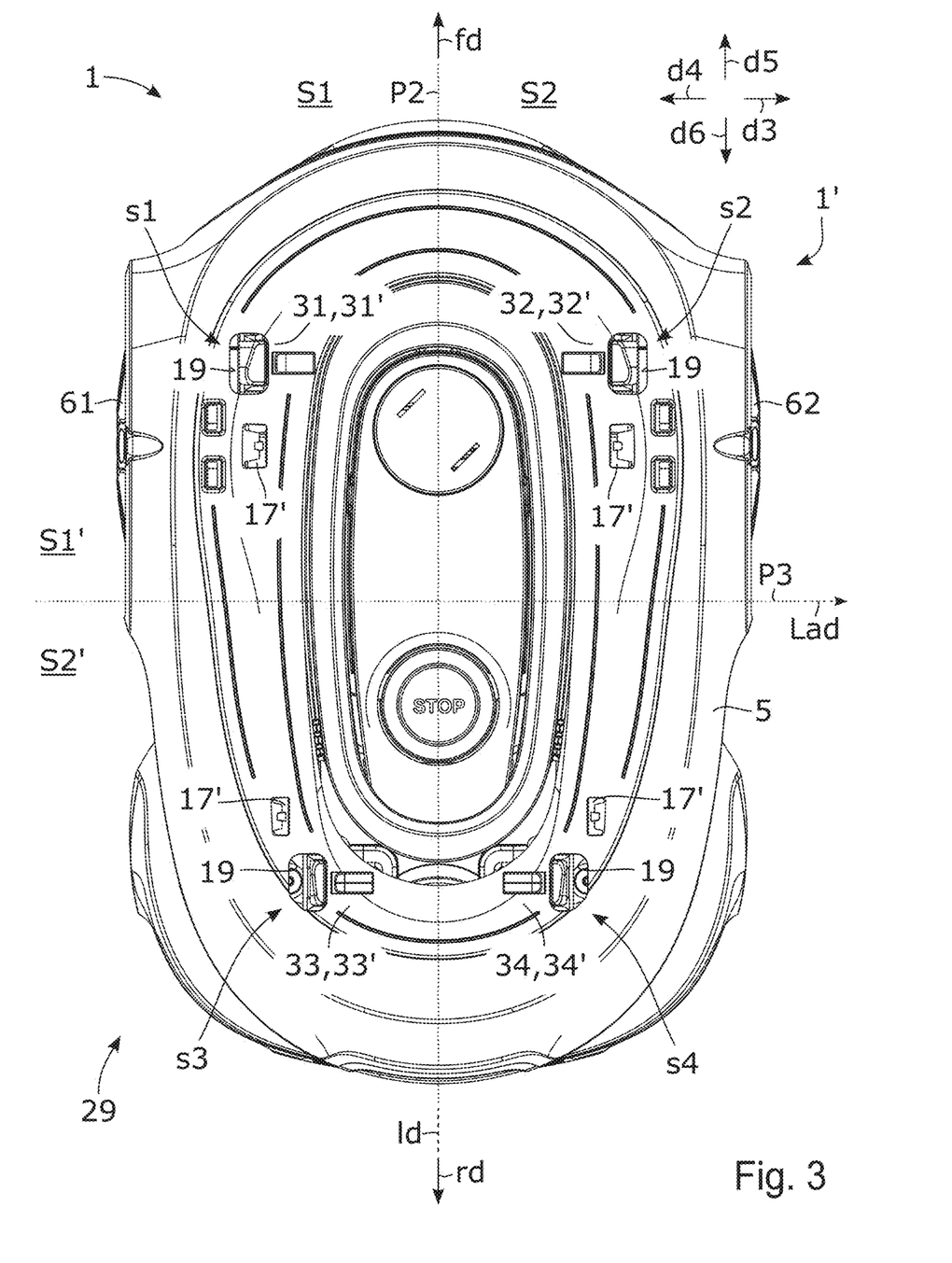
FIG. 3 illustrates a second top view of the robotic work tool illustrated in FIG. 1 and FIG. 2.

FIG. 3 illustrates a second top view of the robotic work tool 1 illustrated in FIG. 1 and FIG. 2. In FIG. 3, the top cover 7 has been removed from the tool body 5.

As can be seen in FIG. 3, the robotic work tool 1 comprises a number of snap fit assemblies s1, s2, s3, s4. The reference sign for the number of snap fit assemblies s1, s2, s3, s4 is abbreviated "s1-s4" in some places herein for reasons of brevity and clarity. The robotic work tool 1 according to the illustrated embodiments comprises four snap fit assemblies s1-s4, namely a first snap fit assembly s1, a second snap fit assembly s2, a third snap fit assembly s3, and a fourth snap fit assembly s4. However, according to further embodiments, the robotic work tool 1 may comprise another number of snap fit assemblies s1-s4, such as a number between one and eight snap fit assemblies.

As is further explained herein, the tool body 5 is attachable to the tool chassis 3 via the number of snap fit assemblies s1-s4. Moreover, the tool body 5 is detachable from the tool chassis 3 via the number of snap fit assemblies s1-s4.

Figure 4:
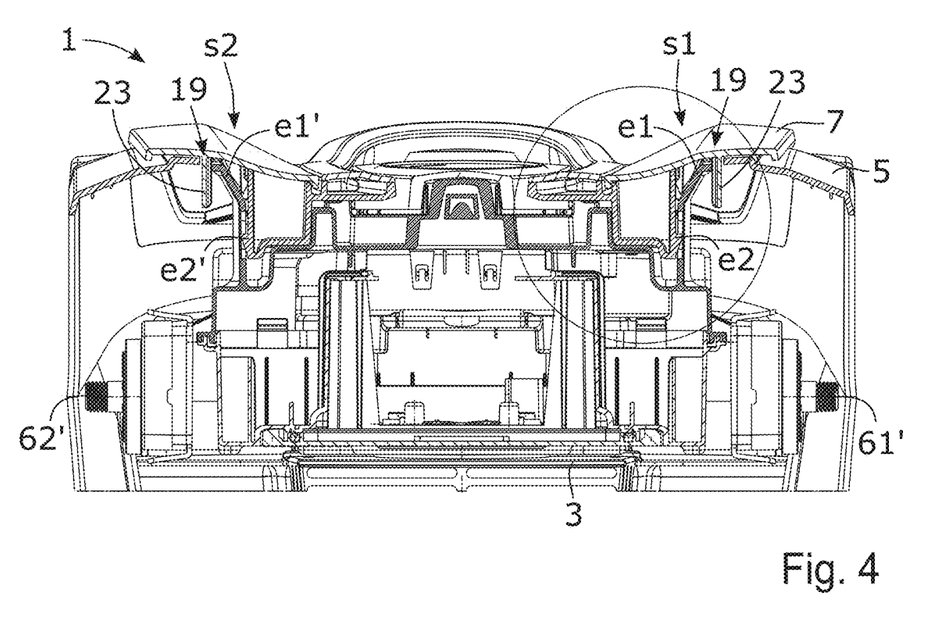
FIG. 4 illustrates a first cross section of the robotic work tool illustrated in FIG. 1 and FIG. 2.

FIG. 4 illustrates a first cross section of the robotic work tool 1 illustrated in FIG. 1 and FIG. 2. The first cross section is made in a plane perpendicular to the first plane P1 indicated in FIG. 1 and at a location of the robotic work tool 1 at which the first and second snap fit assemblies s1, s2 are arranged.

According to the illustrated embodiments, the first and second snap fit assemblies s1, s2 are of identical but mirrored design. Therefore, in the following, reference is mainly made to the first snap fit assembly s1.

Figure 5:
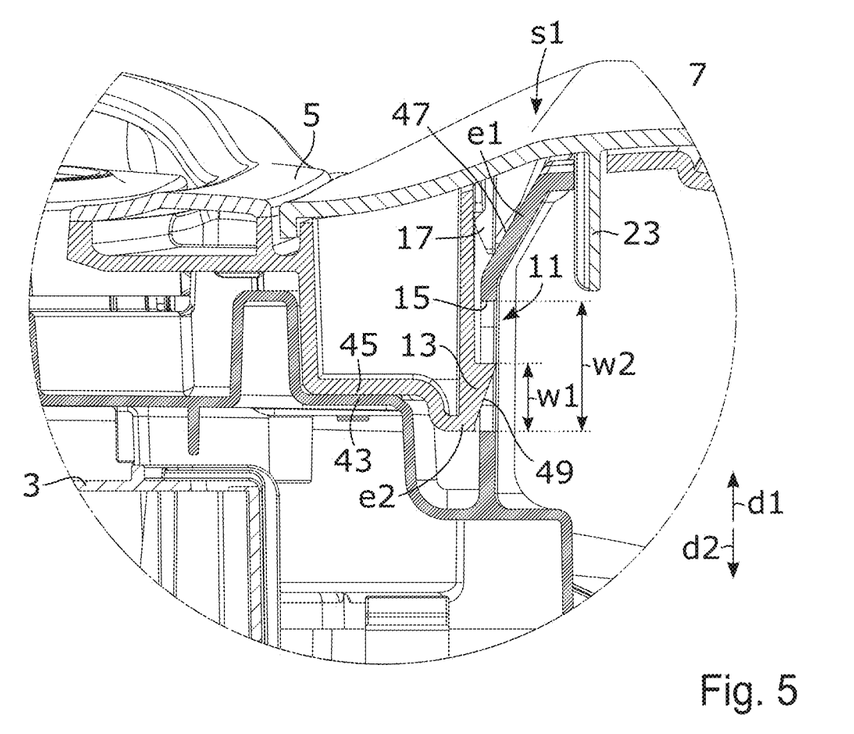
FIG. 5 illustrates an enlarged view of a portion of the first cross section of FIG. 4.

FIG. 5 illustrates an enlarged view of a portion of the first cross section of FIG. 4 which comprises the first snap fit assembly s1. The first snap fit assembly s1 comprises a first snap fit element e1 arranged on the tool chassis 3. Moreover, the first snap fit assembly s1 comprises a second snap fit element e2 arranged on the tool body 5. According to the illustrated embodiments, the first snap fit element e1 comprises a snap fit aperture 11 and the second snap fit element e2 comprises a snap fit protrusion 13. As can be seen in FIG. 5, the snap fit protrusion 13 is configured to protrude into the snap fit aperture 11 when the tool body 5 is attached to the tool chassis 3.

According to further embodiments, the second snap fit element e2 may comprise a snap fit aperture 11 and the first snap fit element e1 may comprise a snap fit protrusion 13 configured to protrude into the snap fit aperture 11 when the tool body 5 is attached to the tool chassis 3.

Two directions d1, d2 are indicated in FIG. 5. The directions d1, d2 are also indicated in FIG. 1. As seen in FIG. 1, the directions d1, d2 are each perpendicular to the first plane P1. The directions d1, d2 may be referred to as vertical directions because they point in vertical directions when the first plane P1 is horizontal, i.e., when the robotic work tool 1 is positioned in an intended upright use position onto a flat horizontal surface, as is the case in FIG. 1.

Below, simultaneous reference is made to FIG. 1-FIG. 5, if not indicated otherwise. As can be seen in FIG. 5, the width w2 of the snap fit aperture 11 is greater than the width w1 of the snap fit protrusion 13 measured in the directions d1, d2 perpendicular to the first plane P1. Moreover, as mentioned, the first and second snap fit assemblies s1, s2 are of identical but mirrored design. As indicated in FIG. 4, the second snap fit assembly s2 comprises a first snap fit element e1' arranged on the tool chassis 3 and a second snap fit element e2' arranged on the tool body 5. Accordingly, the first and second snap fit elements e1', e2' of the second snap fit assembly s2 are identical, but with a mirrored design, as the first and second snap fit elements e1, e2 of the first snap fit assembly s1.

Thereby, as is further explained herein, the number of snap fit assemblies s1-s4 is configured to allow movement of at least a portion the tool body 5 relative to the tool chassis 3 between a lowered and a raised position in directions d1, d2 substantially perpendicular to the first plane P1 when the tool body 5 is attached to the tool chassis 3 via the number of snap fit assemblies s1-s4. In FIG. 1-FIG. 5, the tool body 5 is illustrated in the lowered position.

Figure 6:
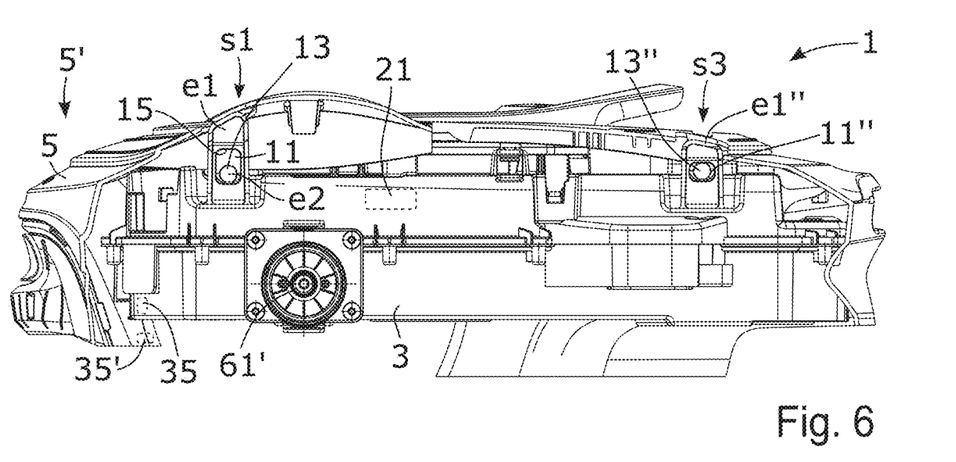
FIG. 6 illustrates a second cross section of the robotic work tool explained with reference to FIG. 1-FIG. 5.

FIG. 6 illustrates a second cross section of the robotic work tool 1 explained with reference to FIG. 1-FIG. 5. The second cross section is made in a plane perpendicular to the first plane P1 indicated in FIG. 1 and at a location of the robotic work tool 1 at which the first and the third snap fit assemblies s1, s3 are arranged. In FIG. 6, the tool body 5 is illustrated in the lowered position.

Figure 7:
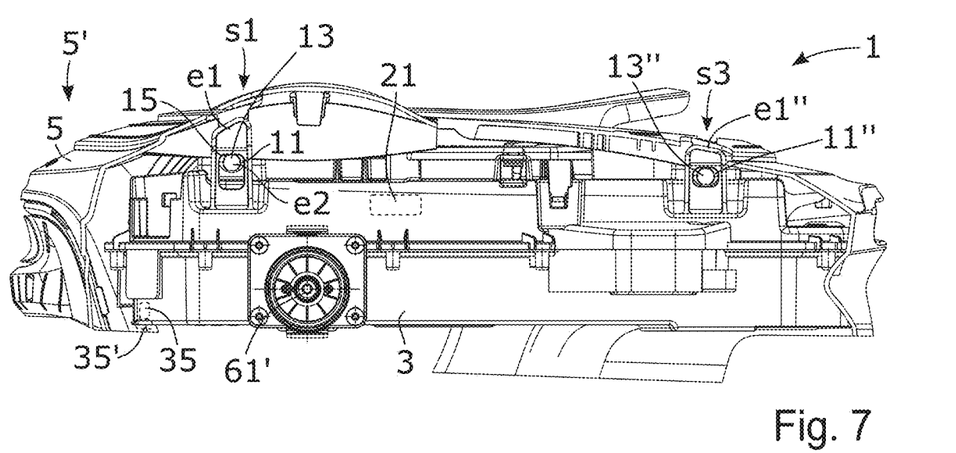
FIG. 7 illustrates the second cross section of FIG. 6 in which the tool body is illustrated in the raised position.

FIG. 7 illustrates the second cross section of FIG. 6 in which the portion 5' of the tool body 5 is illustrated in the raised position. Below, simultaneous reference is made to FIG. 1-FIG. 7, if not indicated otherwise. The portion 5' of the tool body 5 may for example be moved from the lowered to the raised position when a user is lifting the robotic work tool 1 by applying a force onto the portion 5' of the tool body 5 of the robotic work tool 1.

As understood from the above described, according to the illustrated embodiments, the first and second snap fit assemblies s1, s2 allows movement of the portion 5' of the robotic work tool 1 by the large-sized snap fit apertures 11. Moreover, according to the illustrated embodiments, the portion 5' is a front portion of the tool body 5 as seen relative to a forward moving direction fd of the robotic work tool 1.

As indicated in FIG. 6 and FIG. 7, the work tool 1 comprises a sensor 35. The sensor 35 is configured to detect movement of the portion 5' of the tool body 5 from the lowered position to the raised position. According to the illustrated embodiments, the sensor 35 is arranged on the tool chassis 3 and is a Hall effect sensor, sometimes referred to as Hall sensor, which is a type of sensor which detects the presence and magnitude of a magnetic field using the Hall effect. As can be seen in FIG. 6 and FIG. 7, the robotic work tool 1 comprises a magnet 35' arranged on the tool body 5. In this manner, the sensor 35 is able to detect whether the portion 5' of the tool body 5 is in the lowered or in the raised position.

The sensor 35 may be operably connected to the control arrangement 21 and the control arrangement 21 may be configured to cancel operation of one or more arrangements or systems when the sensor 35 detects movement of the portion 5' of the tool body 5 from the lowered position to the raised position. As examples, the control arrangement 21 may cancel operation of propulsion motors and/or a tool of the robotic work tool 1, such as a cutting tool of the robotic work tool 1, when the sensor 35 detects movement of the portion 5' of the tool body 5 from the lowered position to the raised position.

Moreover, as is indicated in FIG. 7, the snap fit protrusion 13 of the first snap fit assembly s1 is configured to abut against an inner delimiting surface 15 of the snap fit aperture 11 to prevent movement of the portion 5' of the tool body 5 past the raised position when the tool body 5 is attached to the tool chassis 3 via the number of snap fit assemblies s1, s3.

The difference in width w1 of the snap fit protrusion 13 compared to the width w2 of the snap fit aperture 11 measured in the directions d1, d2 perpendicular to the first plane P1 may determine the moving distance of the portion 5' of the tool body 5 between the lowered and the raised positions. However, according to the illustrated embodiments, as is indicated in FIG. 5, the tool chassis 3 comprises a resting surface 43 against which a portion 45 of the tool body 5 is configured to abut when the tool body 5 is attached to the tool chassis 3 and when the tool body 5 is in the lowered position relative to the tool chassis 3. Therefore, according to some embodiments, the moving distance of the portion 5' of the tool body 5 between the lowered and the raised positions may be smaller than difference in width w1 of the snap fit protrusion 13 compared to the width w2 of the snap fit aperture 11 measured in the directions d1, d2 perpendicular to the first plane P1.

According to the illustrated embodiments, the width w1 of the snap fit protrusion 13 is approximately 53% of the width w2 of the snap fit aperture 11 measured in the directions d1, d2 perpendicular to the first plane P1. According to further embodiments, the width w1 of the snap fit protrusion 13 may be within the range of 20%-90%, or may be within the range of 35%-70%, of the width w2 of the snap fit aperture 11 measured in the directions d1, d2 perpendicular to the first plane P1.

According to the illustrated embodiments, the interface between the resting surface 43 and the portion 45 of the tool body 5 is horizontal, i.e., parallel to the first plane P1. However, according to further embodiments, the interface between the resting surface 43 and the portion 45 of the tool body 5 may be inclined to facilitate drainage of liquid and matter from this interface.

As is best seen in FIG. 5, according to the illustrated embodiments, the first snap fit element e1 of the first snap fit assembly s1 is formed as a cantilever. The first snap fit element e1 is flexible and can be moved from a locking position, in which the protrusion 13 of the second snap fit element e2 protrudes into the snap fit aperture 11 of the first snap fit element e1, to an unlocking position, in which the protrusion 13 of the second snap fit element e2 does not protrude into the snap fit aperture 11 of the first snap fit element e1. In FIG. 5, the first snap fit element e1 is illustrated in the locking position. According to the illustrated embodiments, the first snap fit element e1 is biased towards the locking position by its own stiffness and can be moved to the unlocking position by being bent to the right in FIG. 5.

However, as is seen in FIG. 5, a securing member 23, which is attached to the tool body 5, prevents the first snap fit element e1 from being moved to the unlocking position and thus prevents the first snap fit assembly s1 from being opened. As can be seen in FIG. 5, and as is further explained in the following, according to the illustrated embodiments, the top cover 7 comprises a number of securing members 23 each configured to prevent one snap fit assembly s1-s4 of the number of snap fit assemblies s1-s4 from opening when the top cover 7 is attached to the tool body 5.

Figure 8:
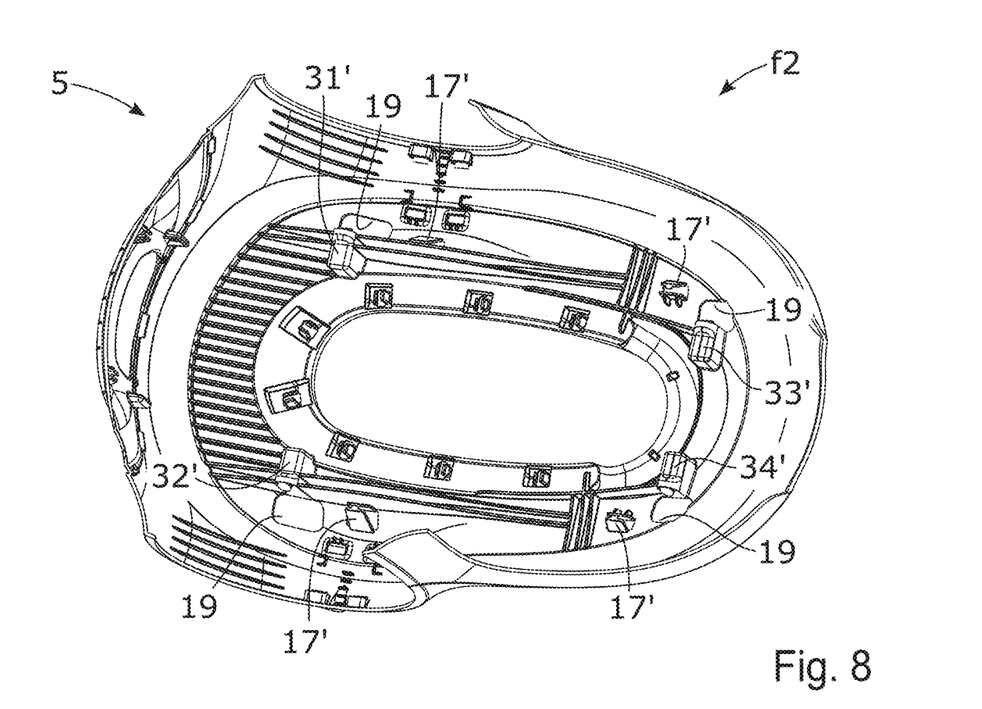
FIG. 8 illustrates a perspective view of an underside of the tool body 5.

FIG. 8 illustrates a perspective view of an underside of the tool body 5. Below, simultaneous reference is made to FIG. 1-FIG. 8, if not indicated otherwise. The underside of the robotic work tool 1 faces the tool chassis 3 of the robotic work tool 1 when the tool body 5 is attached to the tool chassis 3. In FIG. 7 the top cover is not attached to the tool body 5.

Figure 9:
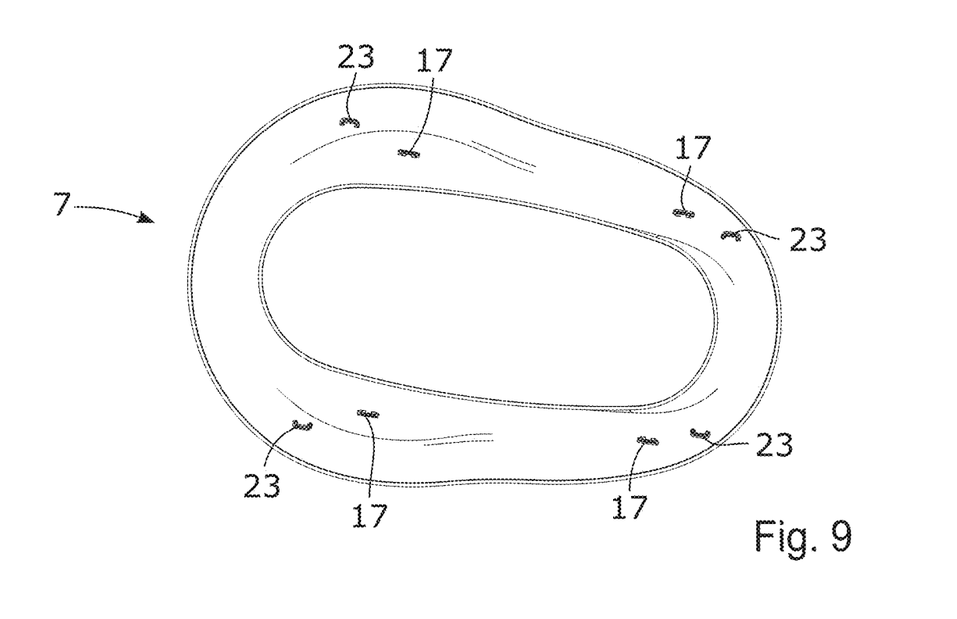
FIG. 9 illustrates a perspective view of an underside of the top cover.

FIG. 9 illustrates a perspective view of an underside of the top cover 7. Below, simultaneous reference is made to FIG. 1-FIG. 9, if not indicated otherwise. The underside of the top cover 7 faces the tool body 5 when the top cover 7 is attached to the tool body 5.

The top cover 7 is attachable to the tool body 5 through releasable attachment means 17, 17'. According to the illustrated embodiments, the releasable attachment means 17, 17' comprises a number of protrusions 17 arranged on the top cover 7 configured to snap into apertures 17' of the tool body 5 so as to attach the top cover 7 to the tool body 5. The apertures 17' of the tool body 5 are also seen and are indicated in FIG. 3.

Moreover, as indicated in FIG. 3, the tool body 5 comprises a number of apertures 19 each arranged at a snap fit assembly s1-s4 of the number of snap fit assemblies s1-s4. Each aperture 19 has a size allowing a portion of at least one finger of a user to be inserted into the aperture 19 to reach the snap fit assembly s1-s4. In this manner, a user can displace the first snap fit elements e1, e1', e1" of the number of snap fit assemblies s1-s4 from a locking position to an unlocking position when the top cover 7 is removed from the tool body 5, as is the case in FIG. 3.

However, as is seen when comparing FIG. 2 and FIG. 3, the top cover 7 is configured to cover the number of apertures 19 when the top cover 7 is attached to the tool body 5. In this manner, the top cover 7 prevents access to the snap fit assemblies s1-s4 when the top cover 7 is attached to the tool body 5. Thereby, an unintended opening of the snap fit assemblies s1-s4 can be prevented in a simple and efficient manner when the top cover 7 is attached to the tool body 5.

Moreover, as seen in FIG. 9, the top cover 7 comprises a number of securing members 23. As mentioned, each securing member 23 is configured to prevent one snap fit assembly s1-s4 of the number of snap fit assemblies s1-s4 from opening when the top cover 7 is attached to the tool body 5. According to the illustrated embodiments, the top cover 7 comprises four securing members 23 since the robotic work tool 1 according to the illustrated embodiments comprises four snap fit assemblies s1-s4.

As can be seen when comparing FIG. 3, FIG. 4, FIG. 5, FIG. 8, and FIG. 9, each securing member 23 is configured to protrude into an aperture 19 of the number of apertures 19 when the top cover 7 is attached to the tool body 5. Moreover, as is best seen in FIG. 4, each securing member 23 is configured to protrude into an aperture 19 at a location adjacent to a first snap fit element e1, e1' to prevent movement of the first snap fit element e1, e1' to the unlocking position. In this manner, it can be further ensured that the tool body 5 is attached to the tool chassis 3 via the number of snap fit assemblies s1-s4 when the top cover 7 is attached to the tool body 5.

As is seen in FIG. 3, each of the first and second assemblies s1, s2 are arranged at a front section 1' of the work tool 1 as seen relative to a forward moving direction fd of the work tool 1. Moreover, as indicated in FIG. 3, the first and second snap fit assemblies s1, s2 are arranged at a respective side S1, S2 of a vertical longitudinal centre plane P2 of the work tool 1. That is, in FIG. 3, a vertical longitudinal centre plane P2 of the work tool 1 is indicated. The vertical longitudinal centre plane P2 of the work tool 1 extends in a vertical direction of the robotic work tool 1 and is thus perpendicular to the first plane P1. Moreover, the vertical longitudinal centre plane P2 of the work tool 1 extends along the longitudinal direction 1d of the robotic work tool 1 at a lateral centre of the robotic work tool 1, hence the term vertical longitudinal centre plane P2. A lateral centre can be defined as a position of the robotic work tool 1 having equal distances to lateral sides of the robotic work tool 1.

Moreover, in FIG. 3, a vertical lateral centre plane P3 is indicated. The vertical lateral centre plane P3 of the work tool 1 extends in a vertical direction of the robotic work tool 1 and is thus perpendicular to the first plane P1. Moreover, the vertical lateral centre plane P3 of the work tool 1 extends along a lateral direction Lad of the robotic work tool 1 at a longitudinal centre of the robotic work tool 1, hence the term vertical lateral centre plane P3. A longitudinal centre can be defined as a position of the robotic work tool 1 having equal distances to longitudinal sides of the robotic work tool 1.

As can be seen in FIG. 3, according to the illustrated embodiments, the third and fourth snap fit assemblies s3, s4 are arranged at an opposite side S2' of the vertical lateral centre plane P3 of the work tool 1 as compared to the first and second snap fit assemblies s1, s2. That is, the first and second snap fit assemblies s1, s2 are arranged on a first side S1' of the vertical lateral centre plane P3 and the third and fourth snap fit assemblies s3, s4 are arranged on a second side S2' of the vertical lateral centre plane P3, wherein the second side S2' is opposite to the first side S1' of the vertical lateral centre plane P3.

The third and fourth snap fit assembly s3, s4 may comprise the same features, functions, and advantages as the first and second snap fit assemblies s1, s2 explained herein. However, according to the illustrated embodiments, as is best seen in FIG. 6 and FIG. 7, the third snap fit assembly s3 is provided with a smaller snap fit aperture 11" of the first snap fit element e1" thereof than the snap fit aperture 11 of the first snap fit assembly s1.

According to the illustrated embodiments, the fourth snap fit assembly s4 is identical, but has a mirrored design, as the third snap fit assembly s3. In other words, the fourth snap assembly s4 has the same size and shape of the snap fit aperture as the third snap fit assembly s3 seen in FIG. 6 and FIG. 7. In this manner, the third and forth snap fit assemblies s3, s4 prevents a rear portion of the tool body 5 to be lifted relative to the tool chassis 3 when the tool body 5 is attached to the tool chassis 3. However, each of the third and fourth snap fit assemblies s3, s4 allows the front portion 5' of the tool body 5 to be lifted from the lowered to the raised position when the tool body 5 is attached to the tool chassis 3 by a slight rotation of the snap fit protrusion 13" inside the snap fit aperture 11'.

According to further embodiments, each of the third and fourth snap fit assemblies s3, s4 may be configured to allow the rear portion of the tool body 5 to be lifted from a lowered to a raised position when the tool body 5 is attached to the tool chassis 3. According to such embodiments, the third and fourth snap fit assemblies s3, s4 may be configured to allow such a movement of the rear portion of the tool body 5 by comprising large-sized snap fit apertures 11" as the snap fit apertures 11 of the first and second snap fit assemblies s1, s2 according to the embodiments herein.

As is indicated in FIG. 3, and as is further explained in the following, the robotic work tool 1 comprises a fixation assembly 29 configured to prevent movement of the tool body 5 relative to the tool chassis 3 in directions d3-d6 substantially parallel to the first plane P1 while allowing movement of at least a portion 5' of the tool body 5 relative to the tool chassis 3 in directions d1, d2 substantially perpendicular to the first plane P1.

Figure 10:
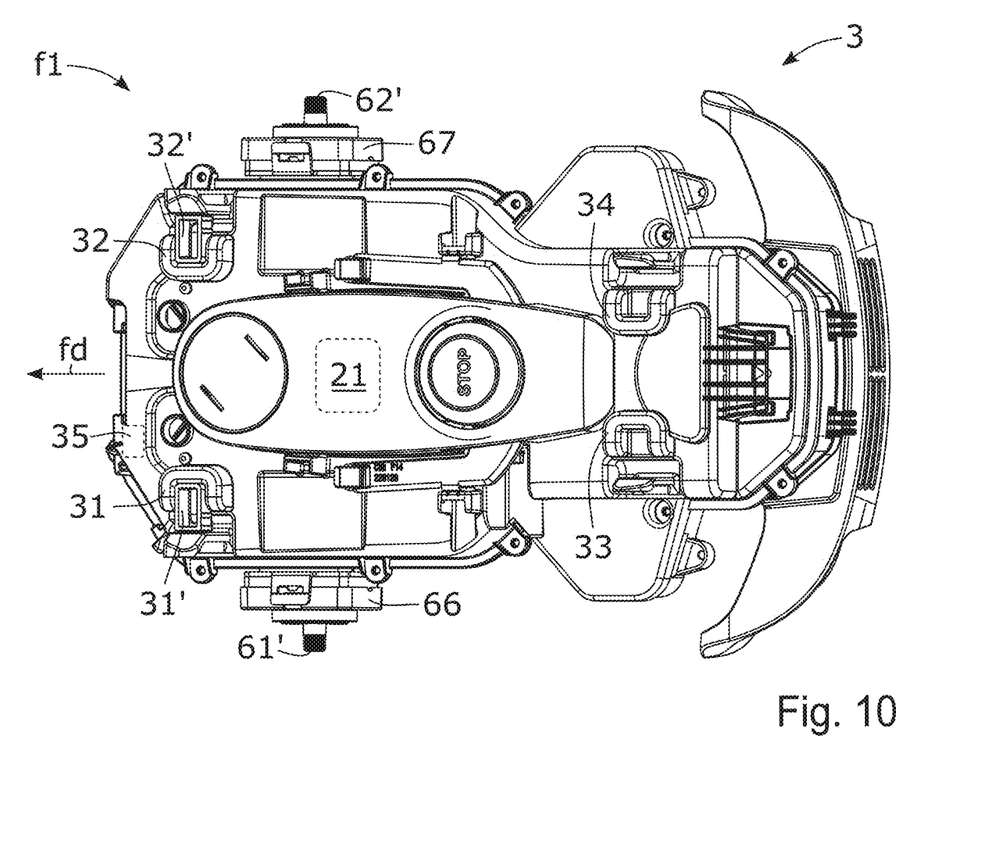
FIG. 10 illustrates a top view of the tool chassis of the robotic work tool explained with reference to FIG. 1-FIG. 9.

FIG. 10 illustrates a top view of the tool chassis 3 of the robotic work tool 1 explained with reference to FIG. 1-FIG. 9. The fixation assembly comprises a first fixation structure f1 arranged on the tool chassis 3. According to the illustrated embodiments, the first fixation structure f1 comprises a number of fixation elements 31, 32, 33, 34 arranged on the tool chassis 3. Moreover, according to the illustrated embodiments, each of the fixation elements 31, 32, 33, 34 is C-shaped but may be provided with a different type of shape.

As can be seen in FIG. 8, the fixation assembly comprises second fixation structure f2 arranged on the tool body 5. The first and second fixation structures f1, f2 are configured to abut against each other when the tool body 5 is attached to the tool chassis 3 to prevent movement of the tool body 5 relative to the tool chassis 3 in directions d3-d6 substantially parallel to the first plane P1 while allowing movement of the tool body 5 relative to the tool chassis 3 in directions d1, d2 substantially perpendicular to the first plane P1. According to the illustrated embodiments, the first fixation structure f1 comprises a number of fixation elements 31', 32', 33', 34' arranged on the tool body 5 in the form of protrusions. Two of the fixation elements 31', 32' of the tool body 5 are also illustrated in FIG. 10. As seen in FIG. 10, the fixation elements 31', 32' of the tool body 5 are configured to protrude into the recess formed by the C-shape of the fixation elements 31, 32, 33, 34 arranged on the tool chassis 3.

The positions of the fixation elements 31, 31', 32, 32', 33, 33', 34, 35' are also indicated in FIG. 3 even though the components per se are not visible. As can be seen when comparing FIG. 3, FIG. 8, and FIG. 10, according to the illustrated embodiments, the fixation assembly 29 comprises a first and a second pair of fixation elements 31, 31', 32, 32' each comprising a fixation element 31, 32 arranged on the tool chassis 3 and a fixation element 31', 32' arranged on the tool body 5, and wherein the first and second pair of fixation elements 31, 31', 32, 32' are arranged at a respective side S1, S2 of the vertical longitudinal centre plane P2 of the work tool 1.

Moreover, the fixation assembly 29 comprises a third pair of fixation elements 33, 33' comprising a fixation element 33 arranged on the tool chassis 3 and a fixation element 33' arranged on the tool body 5, and wherein the third pair of fixation elements 33, 33' are arranged at a different side S2' of a vertical lateral centre plane P3 of the work tool 1 than the first and second pair of fixation elements 31, 31', 32, 32'. Thereby, a rigid and durable fixation is provided of the tool body 5 relative to the tool chassis 3.

As is best seen in FIG. 6 and FIG. 7, the width of the snap fit apertures 11, 11' of the snap fit assemblies s1, s3 are greater than the width of the snap fit protrusions 13, 13" of the snap fit assemblies s1, s3 measured in directions parallel to the longitudinal direction 1d of the robotic work tool 1. Moreover, as can be seen in FIG. 5, the robotic work tool 1 is provided with a certain clearance between the tool body 5 and the tool chassis 3 in the region of the snap fit assembly s1. The fixation assembly 29 is configured to fixate the tool body 5 relative to the tool chassis 3 in directions d3-d6 substantially parallel to the first plane P1 with a smaller tolerance than this clearance and the difference in width between the snap fit apertures 11, 11' and the snap fit protrusions 13, 13" measured in the directions parallel to the longitudinal direction 1d of the robotic work tool 1. Due to these features, lower forces are obtained at the snap fit assemblies s1-s4 for example upon an impact between the robotic work tool 1 and an external object. In this manner, a more durable robotic work tool 1 is provided and the tool body 5 can be attached to the tool chassis 3 via the number of snap fit assemblies s1-s4 in a more secure manner.

As understood from the herein described, due to the features of the robotic work tool 1, a user is allowed to remove the tool body 5 from the tool chassis 3 simply by removing the top cover 7 from the tool body 5, inserting one or more fingers into the apertures 19, and unlocking the snap fit assemblies s1-s4 by displacing the first snap fit elements e1, e1', e1" thereof to the unlocking position and applying a separating force between the tool body 5 and the tool chassis 3, for example by lifting the tool body 5 relative to the tool chassis 3. In this manner, various tasks, such as cleaning, service, repair, maintenance, or replacement of components and parts of the robotic work tool 1 can be performed in a quick and simple manner.

Moreover, due to the features of the robotic work tool 1, a user is allowed to attach the tool body 5 to the tool chassis 3 in a quick and simple manner. As is indicated in FIG. 5, each of the first and second snap fit elements e1, e2 comprises an inclined surface 47, 49. The inclined surfaces 47, 49 ensure that the first snap fit element e1 is moved to the unlocking position when the tool body 5 is placed in an intended assembly position over the tool chassis 3. The snap fit elements e1, e2 of the snap fit assemblies s1-s4 meet each other when the tool body 5 is placed in the intended assembly position over the tool chassis 3.

Thus, according to the illustrated embodiments, the tool body 5 can be attached to the tool chassis 3 simply by positioning the tool body 5 in the intended attachment position over the tool chassis 3. In this process, the first snap fit elements e1 of the snap fit assemblies s1-s4 are displaced from the locking position to the unlocking position and then again are displaced to the locking position when the snap fit protrusions 13 reaches the snap fit aperture 11. The user may be instructed that the top cover 7 should be removed from the tool body 5 when the tool body 5 is attached to the tool chassis 3.

Moreover, due to the apertures 19 in the tool body 5, a user can inspect, visually and or by sensing, if all snap fit assemblies s1-s4 are in the locking positions and then attach the top cover 7 to the tool body 5 to further secure the tool body 5 to the tool chassis 3.

According to the illustrated embodiments, the tool body 5 comprises no electronic components. Instead, all electronic components of the robotic work tool 1 are arranged in the tool chassis 3, such as the sensor 35, the control arrangement 21, and propulsion motors 66, 67. That is, as is indicated in FIG. 10, the tool chassis 3 comprises a pair of propulsion motors 66, 67. Each propulsion motor 66, 67 is configured to rotate a drive wheel 61, 62 via a shaft 61', 62'. One of the shafts 61' is also seen and indicated in FIG. 6 and FIG. 7. According to the illustrated embodiments, each propulsion motor 66, 67 is an electric motor. Moreover, the robotic work tool 1 according to the illustrated embodiments comprises an electric battery configured to provide electricity to the electrical components of the robotic work tool 1. According to the illustrated embodiments, the electric battery is arranged in the tool chassis 3.

The tool body 5 according to the illustrated embodiments is a passive component in the sense that it comprises no electronic or mechanical components for the operation of the robotic work tool 1. Instead, according to the illustrated embodiments, the tool body 5 comprises purely structural and aesthetic components and parts, such as fenders for the number of tool support members 61, 62, 63, and the like.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A self-propelled robotic work tool comprising:
a tool chassis,
a number of tool support members attached to the tool chassis and being configured to abut against a ground surface in a first plane during operation of the work tool,
a number of snap fit assemblies, and
a tool body attachable to the tool chassis via the number of snap fit assemblies,
wherein the number of snap fit assemblies is configured to allow movement of at least a portion the tool body relative to the tool chassis between a lowered position and a raised position in directions substantially perpendicular to the first plane when the tool body is attached to the tool chassis via the number of snap fit assemblies,
wherein the number of snap fit assemblies comprises a first snap fit assembly comprising a first snap fit element arranged on the tool chassis and a second snap fit element arranged on the tool body,
wherein one of the first and second snap fit elements comprises a snap fit aperture and the other of the first and second snap fit elements comprises a snap fit protrusion,
wherein an axial length of the other of the first and second snap fit elements is at least as long as a width of the snap fit aperture, and
wherein the snap fit protrusion is disengaged from both axial ends of the snap fit aperture in the lowered position.

2. The work tool according to claim 1, wherein the snap fit protrusion is configured to protrude into the snap fit aperture when the tool body is attached to the tool chassis.

3. The work tool according to claim 1, wherein the width of the snap fit aperture is greater than the width of the snap fit protrusion measured in a direction perpendicular to the first plane.

4. The work tool according to claim 2, wherein the snap fit protrusion is configured to abut against an inner delimiting surface of the snap fit aperture to prevent movement of the tool body past the raised position when the tool body is attached to the tool chassis via the number of snap fit assemblies.

5. The work tool according to claim 1, wherein one of the first and second snap fits elements is formed as a cantilever.

6. The work tool according to claim 1, wherein the first snap fit assembly is arranged at a front section of the work tool as seen relative to a forward moving direction of the work tool.

7. The work tool according to claim 1, wherein the number of snap fit assemblies comprises a second snap fit assembly, and wherein the first and second snap fit assemblies are arranged at a respective side of a vertical longitudinal center plane of the work tool.

8. The work tool according to claim 7, wherein the number of snap fit assemblies comprises a third snap fit assembly, and wherein the first and third snap fit assemblies are arranged at a respective side of a vertical lateral center plane of the work tool.

9. The work tool according to claim 1, wherein the work tool comprises a top cover attachable to the tool body through releasable attachment means.

10. The work tool according to claim 9, wherein the top cover prevents access to at least one snap fit assembly of the number of snap fit assemblies when the top cover is attached to the tool body.

11. The work tool according to claim 9, wherein the tool body comprises a number of apertures each arranged at a snap fit assembly of the number of snap fit assemblies and having a size allowing access into the aperture to reach the snap fit assembly, and wherein the top cover is configured to cover the number of apertures when attached to the tool body.

12. The work tool according to claim 9, wherein the top cover comprises a number of securing members each configured to prevent one snap fit assembly of the number of snap fit assemblies from opening when the top cover is attached to the tool body.

13. The work tool according to claim 1, wherein the work tool comprises a number of securing members attachable to the tool body, and wherein each securing member is configured to prevent one snap fit assembly of the number of snap fit assemblies from opening when attached to the tool body.

14. The work tool according to claim 1, wherein the work tool comprises a fixation assembly comprising a first fixation structure arranged on the tool chassis and a second fixation structure arranged on the tool body, and wherein the first and second fixation structures are configured to abut against each other when the tool body is attached to the tool chassis to prevent movement of the tool body relative to the tool chassis in directions substantially parallel to the first plane while allowing movement of the tool body relative to the tool chassis in directions substantially perpendicular to the first plane.

15. The work tool according to claim 14, wherein the fixation assembly comprises a first and a second pair of fixation elements each comprising a first paired fixation element arranged on the tool chassis and a second paired fixation element arranged on the tool body, and wherein the first and second pair of fixation elements are arranged at a respective side of a vertical longitudinal center plane of the work tool.

16. The work tool according to claim 15, wherein the fixation assembly comprises a third pair of fixation elements comprising a third paired fixation element arranged on the tool chassis and a fourth paired fixation element arranged on the tool body, and wherein the third pair of fixation elements are arranged at a different side of a vertical lateral center plane of the work tool than the first and second pair of fixation elements.

17. The work tool according to claim 1, wherein the work tool comprises a sensor configured to detect movement of the tool body from the lowered position to the raised position.

18. The work tool according to claim 1, wherein the work tool is a self-propelled robotic lawnmower.

* * * * *